Dec. 26, 1961   K. M. MAIERSHOFER   3,014,417
CAMERA SHUTTER
Filed Nov. 16, 1955   3 Sheets-Sheet 1
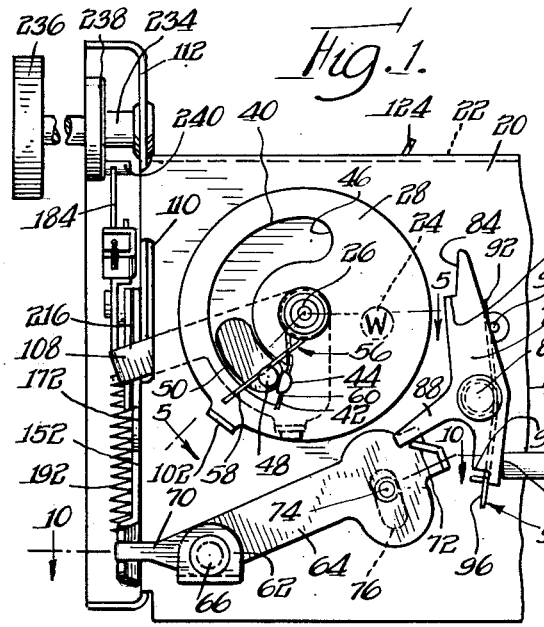
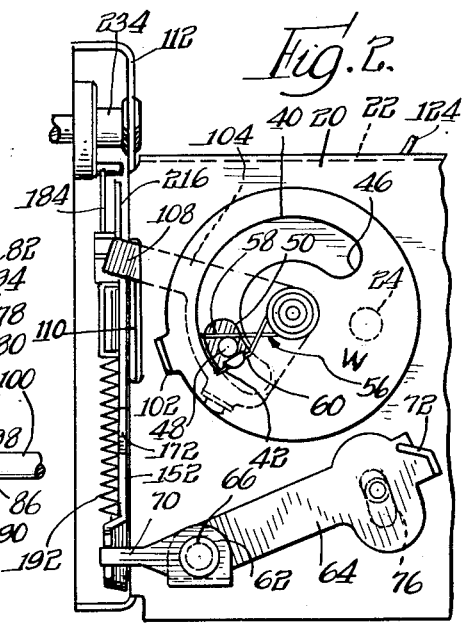
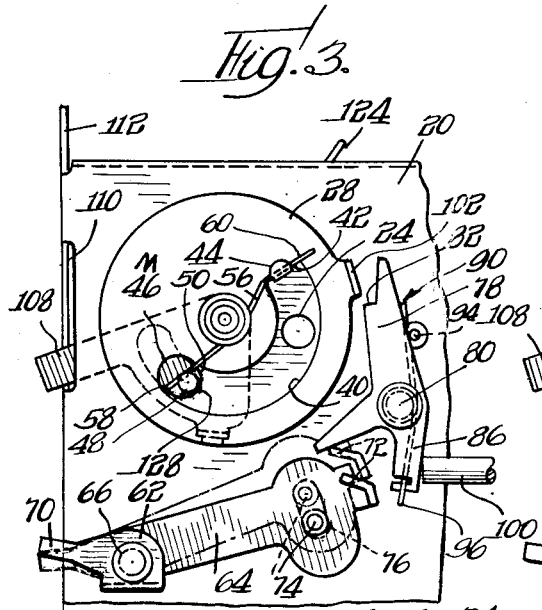
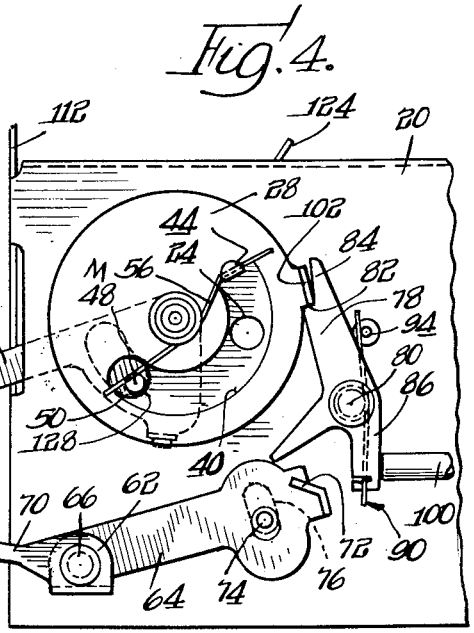
INVENTOR.
Karl M. Maiershofer
BY
Olson & Trexler
attys.

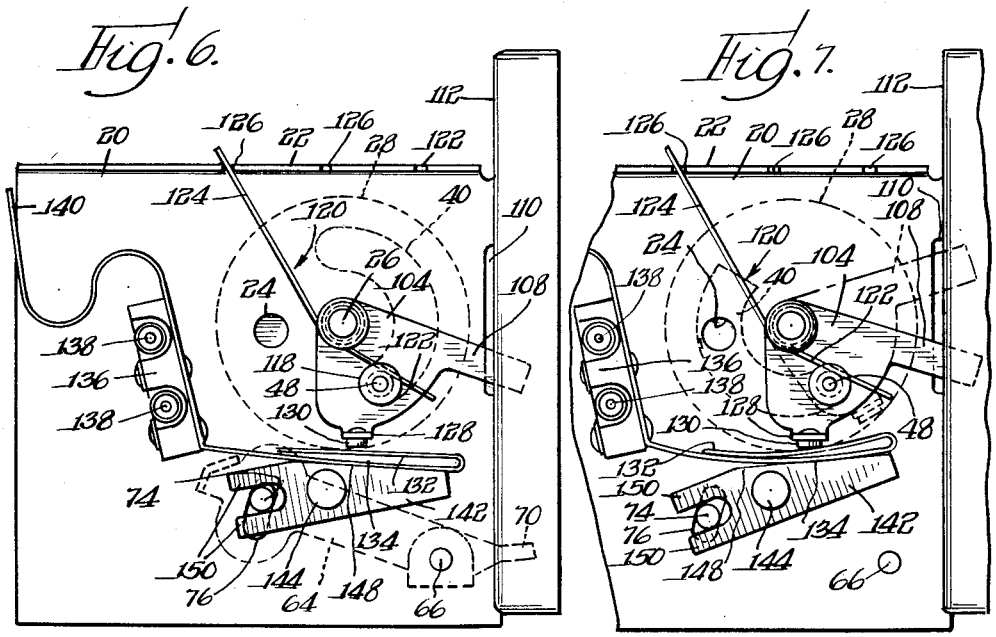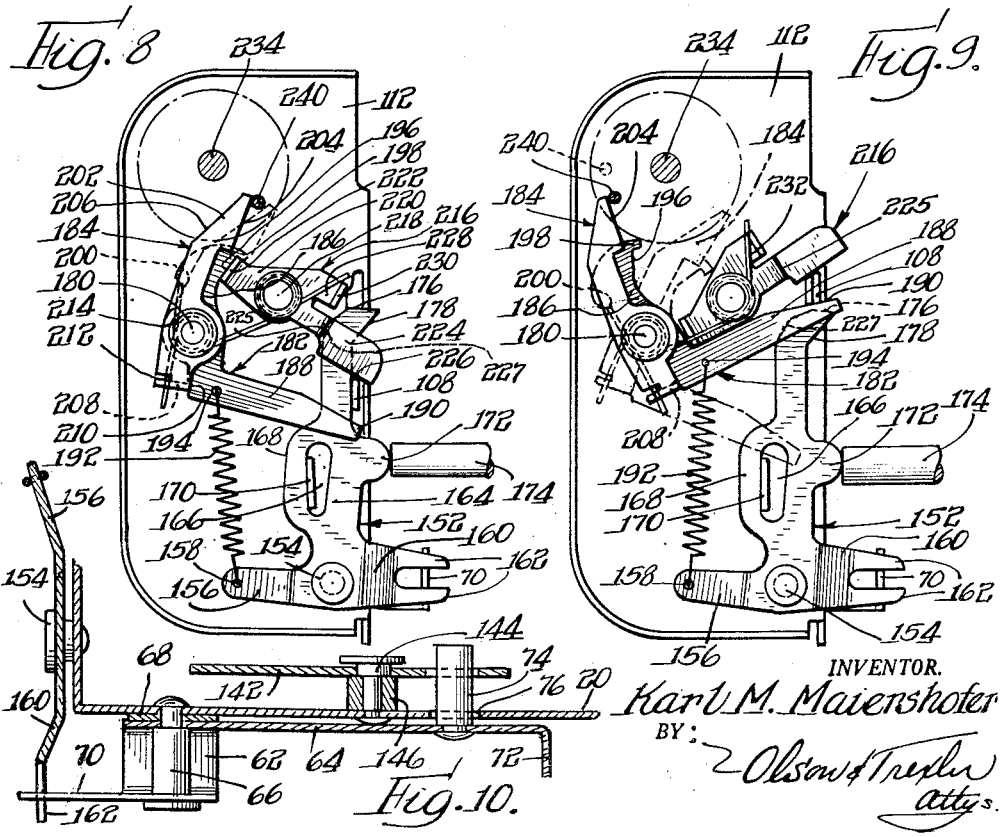

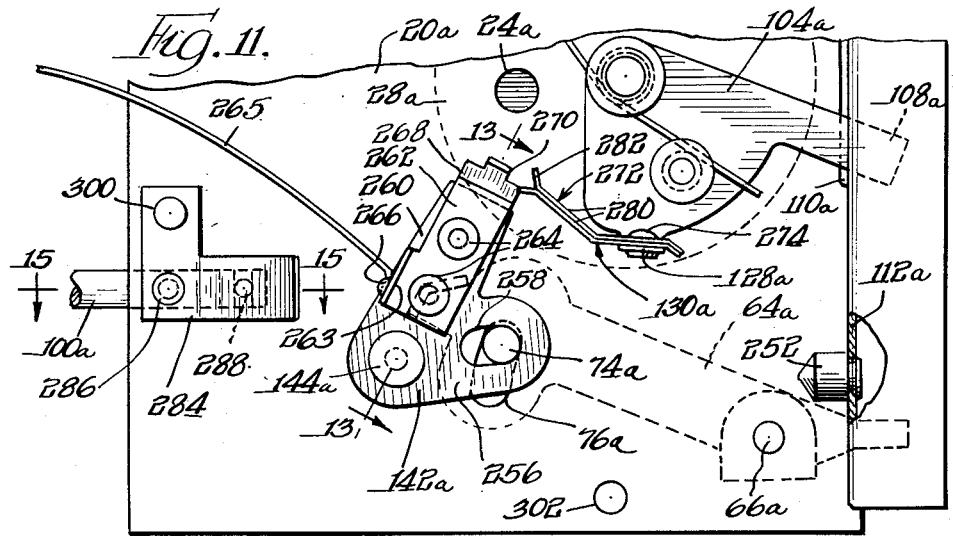
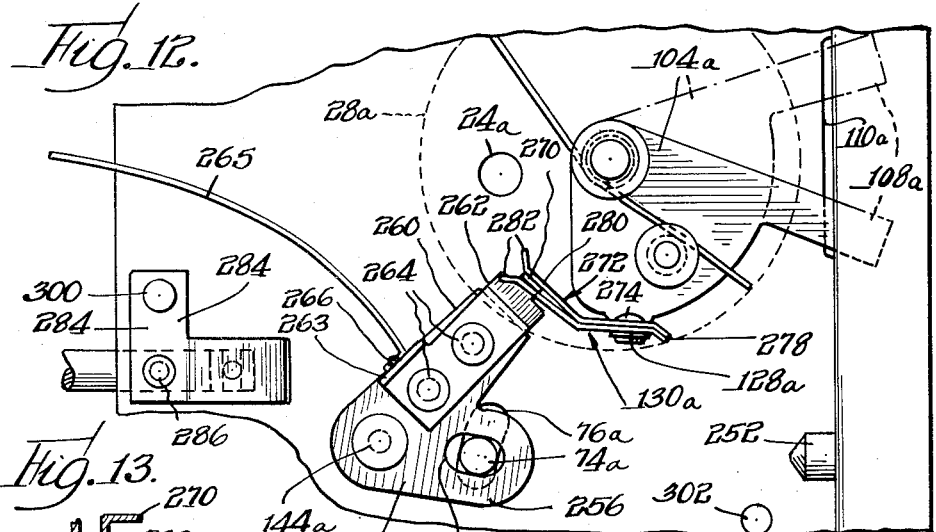
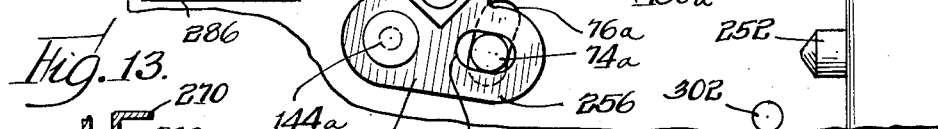
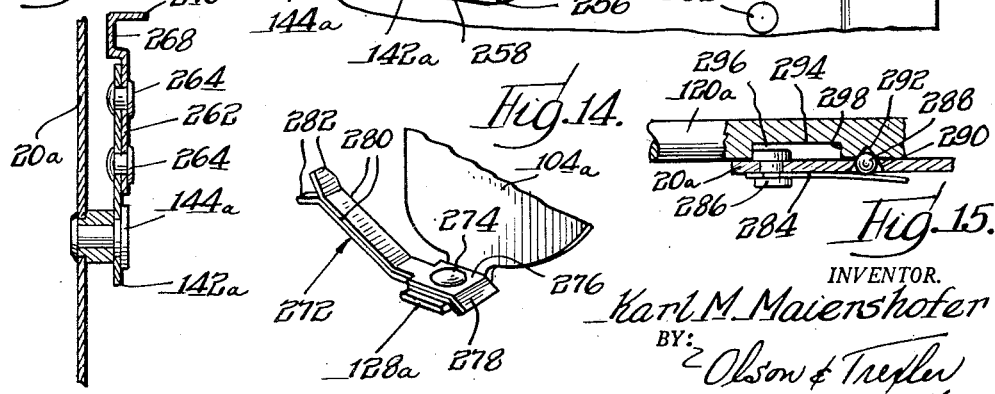

United States Patent Office 3,014,417
Patented Dec. 26, 1961

3,014,417
CAMERA SHUTTER
Karl M. Maiershofer, Norridge, Ill., assignor to G-M
Laboratories Inc., Chicago, Ill., a corporation of Illinois
Filed Nov. 16, 1955, Ser. No. 547,085
8 Claims. (Cl. 95—59)

This invention is concerned generally with the photographic arts, and more particularly with an improved shutter.

Shutters of the multiple leaf type or of the focal plane type, such as are used in expensive and complicated cameras, have reached a high state of perfection and efficiency. However, shutters of the simpler types, such as are used in snap shot cameras, have improved but little over the years. Shutters of this type sometimes are somewhat dependent upon the manner in which the actuating member is manually operated, and this may lead to erratic timing of successive exposures. Such shutters also are prone to change in exposure time with age, due to weakening of springs, and sometimes to dependence on relatively weak spring which do not hold their tension very well. Such shutters all too frequently have been rather expensive and complicated compared with the results obtained.

Arresting the movement of shutter members or parts which operate at fairly high speeds, or with any considerable degree of mass, has been a substantial problem heretofore. Complicated arresting devices have been necessary, and bouncing of parts has been an aggravating problem often leading to double exposures.

It is an object of this invention to provide an improved and simple photographic shutter utilizing the bounce of a moving shutter part to aid in determining the exposure time.

A further object of this invention is to provide a simple photographic shutter wherein a single element serves to impart motion to an exposing member, to reverse the motion thereof, and finally to arrest the motion thereof.

It is another object of this invention to provide an improved flash mechanism in cooperation with a photographic shutter wherein engagement of the flash contacts absorbs no energy from the exposing element and wherein the relatively "fixed" flash contact is held out of contact making position except during the making of an exposure, whereby to obviate all possibility of accidental flashing of a bulb in an associated flash unit.

It is a further object of this invention to provide a flash mechanism positively preventing chattering of contacts, and particularly of the type set forth in the last foregoing object.

Other objects of this invention include the provision of improved mechanism for effecting "time" or "instantaneous" exposures and of improved mechanism for cooperation with setting and releasing structure.

Other and further objects and advantages of the present invention will be apparent from the following description when taken in connection with the accompanying drawings, wherein:

FIG. 1 is a front view of a shutter mechanism constructed in accordance with the principles of this invention with the parts in rest position;

FIG. 2 is a view similar to FIG. 1 with the shutter in cocked position;

FIG. 3 is a view similar to FIGS. 1 and 2 with the parts shown in position for making an exposure of "instantaneous" nature;

FIG. 4 is a similar view showing the parts in position for making a time exposure;

FIG. 5 is a cross sectional view taken substantially along the line 5—5 of FIG. 1;

FIG. 6 is a view of the shutter taken from the rear of FIG. 1 with the parts in quiescent position;

FIG. 7 is a view similar to FIG. 6 showing the parts during the making of an exposure;

FIG. 8 is a view taken at right angles to FIG. 1 from the left side thereof showing the linkage for controlling the shutter mechanism;

FIG. 9 is a view similar to FIG. 8 showing the parts with the shutter in cocked position FIG. 10 is a cross sectional view taken substantially along the line 10—10 in FIG. 1;

FIG. 11 is a view generally similar to FIG. 6 showing a preferred form of the flash mechanism with the parts in quiescent position;

FIG. 12 is a view similar to FIG. 11 showing the parts during the making of an exposure;

FIG. 13 is a cross sectional view through the relatively fixed part of the flash mechanism as taken along the line 13—13 in FIG. 11;

FIG. 14 is a perspective view of the relatively movable part of the flash mechanism; and FIG. 15 is a cross sectional view of the shutter time controlling mechanism as taken along the line 15—15 in FIG. 11.

Referring now in greater particularity to the drawings, and first to FIG. 1, there will be seen a shutter mounting plate 20 having a rigidifying flange 22 along one edge thereof. The shutter mounting plate 20 would be mounted in the front of a camera adjacent the lens or lens system, as will be understood by those skilled in the art, and is provided with an exposure aperture 24 for alignment with a lens system.

A stud 26 (see also FIG. 5) extends through the plate 20 at right angles thereto, and a shutter disc 28 is rotatably mounted thereon by means of a bushing 30 having a flange 32. A washer 34 is interposed between the shutter disc 28 and the shutter mounting plate 20, and the stud 26 is provided with a head 36 holding a small washer 38 against the outer end of the bushing 30. The shutter disc 28 is circular in outline, and is of generally uniform construction for substantial dynamic balance. The shutter disc is provided with an arcuate slot 40 on the order of 180° extent and spaced inwardly from the periphery of the disc a sufficient distance for alignment with the exposure aperture 24 upon pivoting of the disc. The leading edge of the slot 40 at 42 is generally squared off, and is provided with an upwardly and forwardly curled over finger forming a spring anchor 44. The trailing edge of the slot 40 is semicircular in configuration as at 46.

A stud 48 mounted on a part shortly to be described projects through a short arcuate slot 50. The stud is provided with a plastic sleeve 52 which preferably is made of nylon, and with a reduced neck portion 54. A spring 56 is coiled around the shutter disc bushing 30 and has one arm 58 thereof engaging in the reduced neck portion 54, and the other arm 60 thereof engaged in the spring anchor 44 whereby lightly to urge the leading edge 42 of the slot 40 against the nylon sleeve 52 on the stud 48.

Near the lower lefthand corner of the shutter mounting plate 20, as viewed from the front (FIGS. 1–4), there is provided a U-shaped bracket 62 forming an integral part of a time release lever 64. The bracket 62 (see also FIG. 10) is pivotally mounted on a pin or stud 66 and is spaced from the shutter mounting plate by a washer 68. The main body of the lever 64 is integral with the flange of the bracket adjacent the shutter mounting plate 20, while the tail 70 of the lever is integral with the outer flange of the bracket, the tail extending almost in the opposite direction from the main body of the lever. The tail 70 extends generally horizontally, while the main portion of the lever 64 runs slightly upwardly to the right and is provided adjacent its outer end with a flange 72 extending outwardly at right angles away from the shutter mounting plate 20. Adjacent this flange there is provided a stud or pin 74 extending through an arcuate slot 76 in the shutter mounting plate and secured to the lever 64 by having the reduced lower end thereof peened over.

Above and to the right of the time release lever 64 there is provided a time lever 78 pivotally mounted on a stud 80 secured to the plate 20. The time lever 78 has an internal shoulder 82 adjacent its upper edge, and a shallow cam surface 84 leading to this shoulder from the tip of the time lever. The lower end of the time lever 78 is bifurcated to provide a tail 86 and an actuating finger 88 forming an acute angle therewith and extending generally radially from the stud 80 past the flange 72 on the time release lever, the finger 88 being engageable by the flange 72. A spring 90 encircles the pin or stud 80. One end of the spring at 92 bears against a stud or pin 94 extending forwardly from the plate 20, while the other end 96 of the spring is received in a slot 98 in the tail 86 of the time lever 78. The spring 90 thus tends to move the time lever away from the pin 94, but such movement normally is resisted by engagement of the finger 88 against the flange 72. For the making of an instantaneous exposure, such movement of the time lever also is resisted by a slide 100. The slide projects externally of the camera casing (not shown) and is held in an inward position by a detent mechanism (not shown) or the like for making instantaneous exposures, but is movable longitudinally outwards away from the camera casing for the making of time exposures. The slide 100 engages the tail 86 of the time lever as will be apparent in the drawings. When the slide is retracted and the time release lever 64 is pivoted down (as shown in FIG. 4) as hereinafter will be explained, the shoulder 82 is brought into position to engage a flange 102 on the rim of the shutter disc extending outwardly away from the shutter mounting plate 20 at right angles thereto.

Referring now more particularly to FIGS. 6 and 7 for the parts mounted on the back of the shutter mounting plate 20, there will be seen a shutter cocking lever 104 pivotally mounted on the pin or stud 26. As may be seen in FIG. 5, the pin or stud 26 is provided with a bushing 106 pivoting thereon and carrying the shutter cocking lever 104. The shutter cocking lever 104 is generally shaped as a segment and has an arm 108 extending generally radially from one edge thereof. The arm 108, as also may be seen in the remaining figures of the drawings, extends through a vertically elongated slot 110 at the junction of the shutter mounting plate 20 with an end plate 112. The stud 48 is mounted on the shutter cocking lever 104 at a depressed position therein, as is illustrated at 114 (FIG. 5). A circumferential flange 116 on the pin properly positions the pin, while a bushing 118 having an undercut shoulder therein is mounted on the outer end of the pin. It will be understood that the flange 116 can be integral with the pin, or can be a washer thereon.

A spring 120 encircles the shutter cocking lever bushing 106, and one end 122 thereof engages in the shoulder of the bushing 118 on the stud or pin 48. The opposite end 124 of the spring 120 engages in any of a plurality of slots 126 spaced along the flange 22 at the top of the shutter mounting plate. This spring normally urges the shutter cocking lever down into a stopped or limited position with the stud 48 engaging the lower edge 128 of the short arcuate slot 50. The force with which the shutter cocking lever is urged in this direction depends upon which of the slots 126 the upper end 124 of the spring 120 is received in. This provides a convenient means for compensating for differences in springs occurring during manufacture.

Near the radial edge of the shutter release lever opposite to the edge from which the arm 108 extends, there is provided a small flange 128 extending at right angles away from the shutter mounting plate. On the flange 128 there is provided a flash contact 130 cooperable with a flash contact 132 forming a rearwardly bent portion of a flexible contact strip 134. The flexible contact strip 134 is mounted on an insulating block 136 secured to the shutter mounting plate by any suitable means such as rivets 138. The flexible contact strip 134 extends beyond the insulating block 136 as at 140 for connection to a suitable external flash connector for cooperation with a flash unit. The position of the contact spring 134 normally is such that the contact 132 is positioned where it cannot be engaged by the contact 130, as is shown in FIG. 6.

A flash synchronization lever 142 of fibre or other nonconducting material is pivotally mounted on a stud 144 (FIGS. 6, 7 and 10) and is spaced from the shutter mounting plate 20 by a sleeve or collar 146. A diagonal edge 148 on the flash synchronization lever 142 backs up the contact spring 134 and determines the position thereof. The opposite end of the flash synchronization lever is bifurcated to provide a pair of fingers 150, and the stud 74 projecting from the time release lever through the slot 76 is received between these fingers for pivoting the flash synchronization lever from the normal position shown in FIG. 6 to the exposing position shown in FIG. 7 in which the spring 134 is moved upwardly to move the contact 132 into position to be engaged by the contact 130.

Although it is within the contemplation of this invention that any of a variety of control mechanisms might be utilized for controlling the action of the shutter heretofore shown and described, a specific control or linkage mechanism for effecting this purpose is shown in FIGS. 8 and 9. This mechanism is mounted on the end plate and comprises a shutter release lever 152 generally in the shape of an inverted T pivotally mounted on a stud or pin 154 substantially at the junction of the stem and cross arm of the T. One cross arm 156 of the T forms a spring anchor and is provided with an aperture 158 for receiving the tail end of a spring as hereinafter will be set forth. The opposite end of the cross arm as at 160 is bifurcated, having a pair of spaced apart parallel fingers 162 between which the tail 70 of the time release lever is received. The stem of the T of the lever 152 is positioned close to the end plate 112 for stability, but the ends of the cross arms are displaced outwardly somewhat therefrom for operating clearance for the spring hereinafter to be described, and for determining the operating length of the lever arm comprising the tail 70 of the time release lever 64.

The stem of the lever 152, hereinafter identified by the numeral 164, is provided with a longitudinal slot 166 adjacent an enlargement 168. In this slot is received a flange 170 projecting from the surface of the end plate 112 to limit pivoting movement of the lever 152. Opposite to the enlargement 168 there is a protuberance 172 engageable by a push member 174. The push member 174 extends externally of the camera casing or housing (not shown) for depression by the finger of the photographer to pivot the lever 152 for effecting an exposure as hereinafter will be set forth.

The upper end of the stem 164 of the lever 152 is provided with a flat edge 176 serving to hold the arm 108 of the shutter cocking lever in raised position when the shutter is cocked. Beneath the edge 176 and on the right side of the stem as viewed in FIGS. 8 and 9, there is provided an undercut, oblique cam edge 178.

A stud or pin 180 is provided on the end plate 112, and a generally L-shaped shutter cocking intermediate lever 182 is pivoted on this stud, as is a shutter cocking pawl 184. The L-shaped intermediate lever 182 is pivoted more or less midway of the short arm 186 thereof, rather than at the apex or junction of the arms. The relatively long arm 188 has a tip 190 engageable beneath the arm 108 of the shutter cocking lever to raise the same from the position shown in FIG. 8 to the position shown in FIG. 9. A coil spring 192 is stretched between an aperture 194 in this long arm and the aperture 158 in the cross arm 156 of the shutter release lever 152. Following raising of the arm 108 to the position shown in FIG. 9, the arm 188 of the intermediate lever is lowered by the spring 192 and the arm 108 is supported by the tip 176 of the shutter release lever 152.

The shorter arm of the L-shaped lever 182 is provided along the inner edge with a more or less radial bearing surface 196 having a catch or detent 198 extending outwardly at the upper edge thereof. On the opposite side of the short arm 186 there is an indentation 200 serving as a spring anchor as will be brought out hereinafter.

The shutter cocking pawl 184 is provided with an operating tip 202 having on the right side thereof a cocking edge 204, and on the left side thereof a cam edge 206. The tail of the pawl is provided with an inturned flange 208 engageable with the shutter cocking intermediate lever 182 substantially at the apex thereof as at 210. The tail of the pawl also is provided with a slot 212 serving as an anchor for one end of a spring 214 mounted on the pivot pin or stud 180, the other end of the spring engaging in the depression or indentation 200 of the intermediate lever.

The stop lever 216 pivoted on a stud 218 on the end plate 112 has a short arm 220 projecting toward the short arm of the intermediate lever. An outwardly directed flange 222 at the end of the short arm of the stop lever engages the edge 196 of the shutter cocking intermediate lever with the parts in the uncocked position shown in FIG. 8 and thus limits the clockwise position of the intermediate lever as urged by the spring 192. The stop lever 216 also has a long arm 224 having a lower edge 226 engaging the shutter cocking lever arm 108. A stub arm 228 above the long arm 224 is provided with an outwardly directed right angle flange 230 serving as an abutment or anchor for one end of a spring 232 wound around the pivot pin or stud 218, the opposite end of this spring being reversely curved about the pin or stud 180 whereby the stop lever is urged in a clockwise direction. As will be apparent from the drawings, the outer end of the long arm 224 of the stop lever is offset outwardly away from the end plate 112 so that the long arm may swing over the stem 164 of the shutter release lever 152. The offset 225 also serves as a stop for the lever 152, engaging a beveled edge 227 on the upper left corner of the lever 152, said edge 227 being perpendicular to a radius from the pivot 228 about to the mid-section of said edge.

The film winding mechanism, part of which is shown at 234, and which includes a film winding knob 236 mounted exteriorly of the housing or casing, includes a flange or plate 238 having one or more axially disposed pins 240 thereon. These pins are located in such a position as to engage the cocking edge 204 of the shutter cocking pawl upon rotation of the knob 236 to wind film from the roll onto a take-up spool. It will be understood that one pin could be used if one and one-half or more revolutions of the winding mechanism are necessary to move the film the appropriate distance for making successive exposures, but that more than one pin must be used for lesser rotation. The camera body or casing (not shown) is provided with the usual red transparent window through which the numbers on the film may be observed to stop the film winding operation at the appropriate time.

Operation of the shutter controlling mechanism

Operation of the shutter controlling mechanism will be understood with reference to FIGS. 8 and 9 in view of the foregoing description and the ensuing description of the sequence of events. The parts are shown in their normal, quiescent position in FIG. 8 following the making of an exposure, and before the film has been wound. Upon turning of the film winding knob 236 the pin 240 moves in a clockwise orbit as viewed in FIGS. 8 and 9 and engages the winding edge 204 of the shutter cocking pawl. The pawl thus is moved pivotally in a counterclockwise direction to the position shown in FIG. 9 Due to abutment of the flange 208 against the edge 210 of the shutter cocking intermediate lever, the shutter cocking intermediate lever 182 also is pivoted in a counterclockwise direction. This causes the edge 190 to lift up beneath the shutter cocking arm 108 to raise the arm to the position shown in FIG. 9. In moving upwardly the arm 108 engages the cam surface 178 of the shutter release lever 152 and momentarily pivots the stem 164 thereof to the left. However, as soon as the arm 108 has passed above the edge 176 of the shutter release lever, this lever moves back to the right under the influence of the spring 192. It will be observed that the stop lever 216 is pivoted in a counterclockwise direction by the arm 108.

Upon further movement of the film winding mechanism the pin 240 passes beyond the tip of the shutter cocking pawl as is shown in dashed lines in FIG. 9. The spring 192 then pivots the shutter cocking intermediate lever 182 and the shutter cocking pawl 184 in a clockwise direction to the position shown in dashed lines in FIG. 9. This position may be limited by engagement of the long arm 188 of the intermediate lever against the struck out flange 170, or the lever may stop somewhat short of this position as the spring anchors 158 and 194 reach a dead center position with the pivot pin or stud 180. It will be observed that the counterclockwise pivoted position of the stop lever 216 provides clearance for the intermediate lever relative to the flange 222 on the stop lever. When the intermediate lever pivots to the dashed line position of FIG. 9 the shutter cocking lever arm 108 drops slightly to the edge 176 at the top of the shutter release lever 152.

The shutter now is in cocked position, and upon depression of the bar or rod 174 under the influence of the push buttom (not shown) the protuberance 172 of the shutter release lever is engaged thereby to pivot the shutter release lever somewhat in a counterclockwise direction. This causes the edge 176 of the shutter release lever to slide from beneath the arm 108, and the shutter cocking lever then is free to pivot under the influence of its spring. The arm 108 thus moves down rapidly, and the stop lever 216 pivots in a clockwise direction under the influence of its spring 232. The flange 222 at the tip of the stop lever bears against the short arm 186 of the intermediate lever and pivots the intermediate lever back toward the position shown in FIG. 8. The edge of the offset 225 engages the upper edge 176 of the lever 152, and when the lever 152 is allowed to return to its initial position the offset drops to the position shown in FIG. 8 with the offset substantially abutting the edge 227. The offset thus serves as a stop preventing further pivoting of the lever 152 until the film has been wound. The shutter release button or the like accordingly cannot be depressed, and the photographer knows he must wind the film. In addition a letter "W" on the disc 28 is positioned in alignment with the lens (FIG. 1) and can be seen through the lens, but moves out of sight (FIG. 2) upon winding of the film. It will be appreciated that it is possible for the pin 240 to stop in a position where it would engage the cam edge 206 of the shutter cocking pawl upon such counterclockwise movement of the intermediate lever. It is for this reason that the pawl is provided and is spring urged to its normal position relative to the shutter cocking intermediate lever. The pawl can stop short of its normal position as is shown in dashed lines in FIG. 8, and upon subsequent rotation of the film winding mechanism the pin will merely slide along the cam edge 206 until the pin has left this edge, at which time the pawl returns to its normal position where it is picked up by the pin 240 upon the subsequent revolution of the film winding mechanism.

Operation of the shutter

The normal position of the uncocked shutter is shown in FIGS. 1 and 6. As previously has been explained, operation of the film winding mechanism causes the shutter cocking intermediate lever 182 to lift the arm 108 of the shutter cocking lever, and this cocked position is shown in FIG. 2. Such lifting of the arm 108 causes pivoting of the shutter cocking lever to move the pin or stud 48 upwardly in the arcuate slot 50 as is shown in FIG. 2.

Upon pivoting, release movement of the shutter release lever in the manner heretofore described, the arm 108 is released. The shutter spring 120 thus snaps the shutter cocking lever 104 down from the position shown in dashed lines in FIG. 7 and also shown in FIG. 2 to the position shown in solid lines in FIG. 7 and also shown in FIG. 3. Such downward movement is arrested suddenly by engagement of the pin 48 against the lower end 128 of the slot 50. The nylon or other plastic sleeve 52 prevents the metal-to-metal contact, and thus quiets the operation substantially. During such downward movement of the shutter cocking lever, the pin 48 pushes against the leading edge 42 of the arcuate slot 40, and thus carries the shutter disc 28 with it. Upon stopping of the pin 48 the disc continues due to its inertia until the trailing edge 46 of the slot 40 engages the pin 48. The nylon or other sleeve 52 again leads to quiet operation, and also imparts a more resilient bounce to the shutter disc as its direction of rotation is reversed. Bouncing of the disc causes it to return to its initial position shown in FIG. 1. The spring 56 helps to hold the leading edge 42 of the slot up against the pin, except during movement of the disc, but has substantially no effect on the exposure time as it is such a light spring as to exert very little force on the disc tending to rotate the disc in a clockwise direction as viewed in FIGS. 1–4.

The exposure is determined almost solely by the mass of the shutter disc, the length of the slot 40, and the speed at which the disc is moving when the pin 48 is arrested. The mass of the disc is the most important determinant and easily can be controlled in production to much closer limits than is economically feasible in the case of springs. The spring 120 has a relatively small effect in this shutter in determining exposure time. Accordingly, it is easier to build this shutter for extremely accurate exposure speeds than ordinary shutters, and the exposure speeds will not vary substantially with time.

The normal position of the time release lever 64 is shown in FIGS. 1 and 2, and in FIG. 3 in dashed lines. When the shutter release lever is pivoted during release of the shutter, the time release lever 64 pivots to the full line position shown in FIG. 3, thus freeing the time lever 78 from the restraining influence of the time release lever. The spring 90 urges the time lever in a counterclockwise direction, but such movement is resisted by the slide 100. Thus, the time lever 78 is held against its stop, and the shoulder 82 of the time lever is held out of the way of the flange 102 on the shutter disc 28.

However, when the slide 100 is retracted, as is shown in FIG. 4, the time lever 78 is allowed to move away from its stop, and pivots a short distance under the influence of the spring 90 to bring the shoulder 82 into position to engage the flange or lug 102. Accordingly, the shutter disc is arrested with the slot 40 aligned with the exposure aperture 24, and the exposure continues until such time as the push button or other shutter release member is allowed to return to its normal position. At this time, the shutter release lever 152 pivots back to its normal position, and the time release lever also pivots back to its normal position, the flange or finger 72 engaging the stub arm of the time lever to pivot it back against its stop, thereby freeing the shutter disc 28 which is moved by the light spring 56 in a clockwise direction to complete the exposure.

Upon reference to FIG. 7 it will be seen that pivoting of the time release lever 64 effects pivoting of the insulating flash synchronization lever 142 through the intermediary of the pin or stud 74, whereby to bend the contact spring 134 up to position the contact 132 where it will be engaged by the contact 130 as the shutter cocking lever 104 pivots to its lower limited position.

It will be understood that once the flash contacts have moved into engagement, they must remain firmly in engagement. Chattering or other non-reliable engagement of the contacts cannot be tolerated inasmuch as the critical timing between the firing of the flash bulb and the position of the shutter disc or exposing element would be thrown off thereby. In a preferred form of the flash mechanism, described hereinafter and shown in FIGS. 11–14, a positive engagement of the flash contacts is effected which positively eliminates chattering and all other forms of defective operation.

In the preferred flash contact mechanism now to be described, the shutter remains identical with that previously described. Many other parts are similar to, or analogous to, parts previously described. Such identical, similar, or analogous parts are identified by the same numerals as used heretofore with the suffix a. Thus, the shutter mounting plate 20a remains similar to that previously disclosed, including the end plate 112a thereon. One part is shown mounted on the end plate, namely the film spool stud 252, not previously described. It will be understood that the film spool stud is equally applicable to all forms of the invention, and is secured to the end plate by any suitable means, such as by the rivet shown. The shutter disc 28a and its mounting and operation remain identical with those previously described, as does the exposure aperture 24a. The shutter cocking lever 104a is unchanged, and is provided with the radially extending arm 108a cooperable with shutter controlling mechanism such as that previously described. The time release lever 64a is unchanged, being pivoted at 66a, and having the stud 74a projecting through the opening 76a.

The pivot 144a of the insulating flash synchronization lever 142a is moved to the left of the stud 74a as viewed from the rear (FIGS. 11 and 12). The flash synchronization lever is changed in form, being substantially V-shaped and having the pivot 144a substantially at the apex thereof. One of the arms of the lever 142a is relatively short, and this arm 256 projects generally horizontally to the right and is provided with an elongated aperture or slot 258 receiving the end of the stud 74a. The other, or longer, arm 260 of the flash synchronization lever extends diagonally upwardly to the right, and a flash synchronization plate 262 is secured thereon by suitable means such as rivets 264. The plate 262 is provided at its lower left edge with a right angularly disposed flange 263, and a flexible wire 265 is soldered thereto at 266. The wire 265 is of a flexible nature, preferably being stranded or braided, and is connected to an external flash contact for cooperation with a flash gun. The flash synchronization plate 262 is completed by an offset portion 268 at the upper end thereof and spaced closer to the plate 20a than the remainder of the flash synchronization plate 262, the offset portion having a rearwardly directed finger or lug 270.

As may be seen in FIGS. 11, 12 and 14, the shutter cocking lever 104a is provided toward the lower edge thereof with a flange or lug 128a r earwardly directed at right angles thereto. On this lug there is mounted a pair of flash contact springs 272 by suitable means such as a rivet 274. Each of the pair of contact springs 272 includes a body portion 276 through which the rivet 274 passes, the two body portions having downwardly directed tails 278 projecting along a side of the flange or lug 128a and serving to prevent pivoting about the rivet 274. Pivoting also is prevent by engagement of the edges of the bodies 276 against the portion of the flange or lug 128a lying in the plane of the shutter cocking lever 104a. The pair of contact springs 272 also includes shanks 280 lying in contact with one another. At the upper ends of the shanks 280 there are provided outwardly bent tips 282 forming a generally V-shaped notch engageable with the lug 270 on the flash synchronization plate. It will be understood that the pair of contact springs 272 forms a relatively movable flash contact, while the lug 270 on the flash synchronization plate forms a relatively fixed contact.

The flash mechanism just described is similar to the previously described flash mechanism in that the relatively fixed contact normally is positioned so that it cannot be engaged by the relatively movable contact. However, when the time release lever 64a is pivoted upon releasing of the shutter, the stud 74a moves down as heretofore. This effects pivoting of the V-shaped insulating lever 142a in a clockwise direction, and carries the lug 270 to a position where it can be engaged by the springs 272. More specifically, as the contact springs 272 are carried in a clockwise direction by the pivoting shutter cocking lever, the outwardly deflected tips 282 engage on opposite sides of the lug 270 and the lug is relatively wedged between the contact springs. If there is any tendency for a relative chattering or bouncing of the lug and the contact springs, it is merely forced more tightly against the opposite contact spring. Accordingly, a positive electrical contact is made immediately upon initial engagement of the two contacts, and improper operation is impossible.

Reference previously has been made to the fact that applicant's flash mechanism absorbs energy only from the shutter cocking lever, and not from any part affecting the timing of the exposure. In the preferred form of the invention, it will be apparent that the flash mechanism is usable only with a shutter wherein there is an impulsing member movable independently of the exposure time determining parts, once the parts have been started in motion. The wedging of the lug between the contact springs makes it quite impossible for one of the contacts to be carried by the shutter disc or by an analogous part, as it often is in prior art flash mechanisms. It will be understood that the flash contacts separate upon release of the shutter operating trigger or button by the photographer, through reverse pivoting of the time release lever and the insulating flash synchronization lever.

The slide for determining whether a time or an instantaneous exposure is to be made has been discussed heretofore in rather general terms. A somewhat more specific representation of the slide and its control mechanism is shown in FIGS. 11, 12 and 15. More specifically, the plate 20a is provided on the back side thereof with an L-shaped leaf spring 284 held in place by a rivet 286 at the apex of the spring. The innermost end of the spring bears against a ball 288 mounted in a hole 290 in the plate. This ball is cooperable with a recess 292 in the end of the slide 100a, and normally holds the slide in the innermost position as illustrated in FIGS. 11, 12 and 15. The slide is provided with a recessed or undercut portion 294 providing clearance for the head 296 of the rivet 286, and engagement of the rivet head against a shoulder 298 of the slide limits retraction of the slide when it is retracted to effect a time exposure.

It will be observed that there is an aperture 300 extending through the opposite end of the spring 284. This aperture extends also through the plate 20a, and a bolt or other stud extends through this aperture simultaneously to hold the spring against pivoting, and to mount the shutter mounting plate 20a in the body of the camera. Other apertures through the plate 20a also are provided, for instance the aperture 302 for mounting the plate in the camera body.

From the foregoing it will be apparent that the shutter herein shown and described is of simple and rugged construction. The substantial symmetry of the shutter disc renders the shutter substantially insensitive to variations in operation due to changes in position. It will be appreciated that the shutter cannot jam, and that the tension of the light spring 56 is not critical. The stored energy in the shutter disc, as determined by the mass and speed thereof, and the length of the exposing slot 40 determine the time of the exposure. This exposure time will be understood as being of instantaneous nature and readily can be set in the region of $1/10$ to $1/200$ second or less. The flash mechanism takes no energy from the moving disc, but rather from the shutter cocking lever after the disc has been started in motion, and as a result the flash contact mechanism has no effect on the duration of exposure. Furthermore, in the preferred form of the flash mechanism, there is no possibility of contact chattering and accompanying unreliable operation.

It will be appreciated that reversal of the movement of the shutter disc by engagement against a solid stop results in uniform reversal at all times, whereas various mechanisms heretofore known in the art wherein a shutter blade is reversed in movement by a spring are subject to changing characteristics with aging of the spring, and also vary from one exposure to another in accordance with the manner in which the spring is actuated or engaged.

It is to be understood that the specific example of the shutter as herein shown and described is for exemplary purposes only. Various changes in structure will no doubt occur to those skilled in the art, and are to be understood as forming a part of this invention insofar as they fall within the spirit and scope of the appended claims.

The invention is claimed as follows:

1. The combination for use in a camera comprising a member having an exposure aperture therein, an exposing element normally covering said aperture and oscillatably movable to uncover said aperture, a single member for starting said element in movement to uncover said aperture, for reversing said movement to again cover said aperture, and for arresting movement of said element, means for impulsing said single member in a given direction, and means for arresting said single member in a predetermined position, said exposing element having structure thereon engageable with said single member when impulsed in said given direction, and additional structure engageable with said single member when arrested in said predetermined direction.

2. The combination as set forth in claim 1 wherein the exposure element comprises a disc rotatably mounted on the member having the exposure aperture, said disc having an eccentric opening therein alignable with said aperture, and said single member engaging in said opening at one extremity thereof to start said disc in movement, subsequently engaging in said opening at substantially the opposite extremity thereof for reversing said disc, and finally engaging in said opening substantially at the first mentioned extremity to arrest movement of said disc.

3. The combination for use in a camera comprising a plate having an exposure aperture therein, a cocking lever on one side of said plate and pivotally mounted thereon, a spring urging said cocking lever in a given direction, a projection on said cocking lever engageable by means for cocking and holding cocked said cocking lever, said plate having an opening therein, a projection on said cocking lever extending through said opening, a shutter element mounted on the opposite side of said plate, said shutter element in one position covering said aperture and being movable to uncover and again to cover said aperture for effecting an exposure, the projection through said plate engaging said shutter element and effecting movement thereof upon release of said cocking holding means.

4. The combination for use in a camera comprising a member having an exposure aperture therein, a cocking lever pivotally mounted on said member, spring means urging said cocking lever in a given direction, a projection on said cocking lever for cocking said lever and holding said lever cocked, a shutter projection on said cocking lever, a shutter disc pivotally mounted on said member and having an opening therein, said disc normally covering said exposure aperture and being pivotal in a given direction to uncover said aperture, and pivotal in the opposite direction again to cover said aperture for effecting an exposure, and said shutter projection on said cocking lever engaging in the opening in said disc for effecting movement of said disc upon release of said cocking holding means.

5. The combination as set forth in claim 4 wherein the shutter projection also percussively engages an edge of said shutter disc defining said opening bouncingly to reverse the direction of motion of said shutter disc, and further including a non-metallic resilient section on said shutter projection engaging said disc to quiet operation of said combination.

6. The combination as set forth in claim 5 and further including a light biasing spring acting between said shutter disc and the member having the exposure aperture whereby lightly to bias said disc against the non-metallic resilient section on the shutter projection in the direction opposite to said given direction.

7. The combination for use in a camera comprising a member having an exposing aperture therein, a shutter disc having an opening therein, said shutter disc being pivotally mounted on said member and normally covering said aperture but being pivotal in a given direction to uncover said aperture, means for impulsing said disc in said given direction, means for stopping said disc with said opening aligned with said aperture and for bouncing said disc in the opposite direction again to cover said aperture, a projection on said disc, a stop member selectively engageable with said projection selectively to hold said disc in aperture uncovering position for effecting a time exposure, said stop member comprising a lever, a time release lever normally holding said stop lever out of position for engaging the projection on said disc but releasing said stop lever upon movement of said disc, and a control member selectively engageable with said stop lever to allow or to prevent movement of said stop lever upon release thereof by said time release lever.

8. The combination for use in a camera comprising a plate having an exposure aperture therein, a shutter disc pivotally mounted on said plate at a location spaced from said exposure aperture and having an eccentric opening therein alignable with said exposure aperture upon pivoting of said disc, means normally maintaining said disc in a position with said eccentric opening out of alignment with said aperture, an impulsing member pivotally mounted coaxially with said disc on said plate and having a projection thereon, and means for suddenly pivoting said coaxially mounted member from a predetermined cocked position to a predetermined arrested position, said projection pivoting said disc in a given direction to bring said eccentric opening into alignment with said aperture for effecting an exposure and subsequently bouncing said disc in the opposite direction to move said eccentric opening out of alignment with said aperture.

References Cited in the file of this patent

UNITED STATES PATENTS

| | | |
|---|---|---|
| 2,490,755 | Hutchison | Dec. 6, 1949 |
| 2,522,214 | Dreisbach | Sept. 12, 1950 |
| 2,587,447 | Durst | Feb. 26, 1952 |
| 2,662,457 | Fairbank | Dec. 15, 1953 |
| 2,900,888 | Burger | Aug. 25, 1959 |

FOREIGN PATENTS

| | | |
|---|---|---|
| 871,322 | France | Jan. 15, 1942 |